(12) United States Patent
Girelli et al.

(10) Patent No.: US 7,311,507 B2
(45) Date of Patent: Dec. 25, 2007

(54) POWER CONTROL SYSTEM FOR EQUIPMENT FOR INJECTION MOULDING OF PLASTIC MATERIALS

(75) Inventors: Dario Girelli, Brescia (IT); Peter Dal Bo, Vittorio Veneto (Treviso) (IT)

(73) Assignee: Inglass S.p.A., San Polo Di Piave (Treviso) (IT)

( * ) Notice: Subject to any disclaimer, the term of this patent is extended or adjusted under 35 U.S.C. 154(b) by 0 days.

(21) Appl. No.: 11/369,503

(22) Filed: Mar. 6, 2006

(65) Prior Publication Data

US 2006/0202372 A1   Sep. 14, 2006

(30) Foreign Application Priority Data

Mar. 11, 2005   (IT) .......................... TO2005A0158

(51) Int. Cl.
*B29C 45/74* (2006.01)

(52) U.S. Cl. ..................................... 425/144; 264/40.6

(58) Field of Classification Search ................ 425/135, 425/143, 144; 264/78, 87, 88, 40.6
See application file for complete search history.

(56) References Cited

U.S. PATENT DOCUMENTS

| | | | | |
|---|---|---|---|---|
| 5,206,033 A * | 4/1993 | Stastny | ...................... | 425/143 |
| 5,435,711 A * | 7/1995 | Yamada | ...................... | 425/143 |
| 5,486,105 A * | 1/1996 | Katsumata | .................. | 425/143 |
| 6,104,006 A * | 8/2000 | Kimura et al. | .............. | 219/422 |
| 6,343,920 B1 * | 2/2002 | Terasaki et al. | ............ | 425/143 |
| 6,477,025 B1 * | 11/2002 | Goldbach et al. | ........... | 361/103 |
| 6,495,804 B2 * | 12/2002 | Zahradnik | ................... | 219/421 |
| 6,669,459 B2 * | 12/2003 | Matsubayashi et al. | ..... | 425/143 |
| 6,913,453 B2 * | 7/2005 | Kalantzis | .................... | 425/144 |
| 7,071,449 B2 * | 7/2006 | Godwin et al. | ............. | 219/429 |
| 2002/0084543 A1 * | 7/2002 | Buja | ......................... | 264/40.4 |
| 2002/0182285 A1 * | 12/2002 | Godwin et al. | ............. | 425/549 |
| 2003/0047828 A1 * | 3/2003 | Koyama et al. | ........... | 264/40.6 |
| 2003/0228390 A1 * | 12/2003 | Gellert et al. | ............... | 425/549 |
| 2004/0091562 A1 * | 5/2004 | Pilavdzic et al. | ....... | 425/192 R |
| 2004/0166188 A1 * | 8/2004 | Uchiyama et al. | .......... | 425/144 |
| 2004/0213867 A1 * | 10/2004 | Kalantzis | .................... | 425/144 |
| 2004/0258786 A1 * | 12/2004 | Senda et al. | ................ | 425/143 |
| 2004/0258787 A1 * | 12/2004 | Olaru et al. | ................ | 425/143 |
| 2005/0082707 A1 * | 4/2005 | Sabin et al. | ................ | 264/40.1 |
| 2005/0173820 A1 * | 8/2005 | Schneider et al. | ......... | 264/40.1 |
| 2005/0288807 A1 * | 12/2005 | Tooman et al. | ............... | 700/97 |

FOREIGN PATENT DOCUMENTS

| DE | 4234119 A1 * | 4/1993 |
|---|---|---|
| EP | 587963 A1 * | 3/1994 |
| EP | 1252998 A2 * | 10/2002 |

* cited by examiner

*Primary Examiner*—James P. Mackey
*Assistant Examiner*—Dimple N. Bodawala
(74) *Attorney, Agent, or Firm*—Heslin Rothenberg Farley & Mesiti P.C.; Victor A. Cardona, Esq.

(57) ABSTRACT

The identification and location of possible faults of operation and/or installation of a hot runner are obtained through the measurement of the absorption of power by the heating resistors applied to the arms and to the injectors of the hot runner. The qualitative and quantitative analysis of the power absorbed by the resistors also enables identification of the type of possible faults and the corresponding seriousness.

6 Claims, 6 Drawing Sheets

Series

Series 1 = value measured

Series 2 and 3 = upper and lower control limit

Series 4 = mean of process

POWER CONTROL SYSTEM FOR EQUIPMENT FOR INJECTION MOULDING OF PLASTIC MATERIALS

CROSS REFERENCE TO RELATED APPLICATIONS

This application is a U.S. National Phase of Italian Application No. TO2005A000158, filed on Mar. 11, 2005, the entire disclosure of which is incorporated herein by reference.

FIELD OF THE INVENTION

The present invention relates in general to injection-moulding equipment for plastic materials, of the type comprising at least one flow unit for the plastic material in the fluid state with at least one heating device including at least one electrical resistor with associated control thermocouple, supplied by a power unit, and a thermoregulation unit for modulating the supply of said resistor by the power unit as a function of the temperature detected by the thermocouple.

The term "flow unit" is intended to designate, in the description and in the ensuing claims, in particular—although not exclusively—a hot-runner system formed by tubular arms with associated injectors for conveying the plastic material to the points of injection defined in a mould. Flow units of this sort must keep the plastic material in the fluid state at the correct heating temperature so that the arms of the hot runners and the corresponding injectors are equipped with one or more heating resistors controlled by one or more thermocouples operatively connected to the thermoregulation unit. Said thermoregulation unit detects the temperatures measured by the thermocouples and modulates the electrical power applied to the resistors, increasing it or decreasing it according to whether the temperature detected is lower or higher than a pre-set threshold.

In the flow units discussed herein, various drawbacks may arise, during operation, which can alter correct functionality of the moulding system and consequently jeopardize the quality of the moulded articles. The drawbacks can derive, for example, from an erroneous or imprecise assembly of the hot runner and of the corresponding components and may consist in an incorrect contact between injectors and mould, or else leakages of plastic material, or else again leakages of the water for cooling the mould to which the flow unit is associated, or else failure of the resistor itself, or yet other forms of malfunctioning.

SUMMARY OF THE INVENTION

It would then be desirable to provide an efficient system of control for detecting the onset and, if possible, locating the origin of the possible malfunctioning, whether in an initial step of testing of the flow unit or in the course of its normal operation, so as to provide a corresponding remedy.

The object of the invention is precisely that of identifying a method and making available a system of detection and warning of possible faults of operation of flow units for injection-moulding equipment for plastic materials of the type specified above.

According to the invention, this object is achieved thanks to the fact that said thermoregulation unit is arranged to check the absorption of power of said at least one resistor and for detecting, through the checked absorption, indications corresponding to any faults of operation and/or installation of said flow unit.

The invention is based upon the realization that each individual area of heating of the flow unit is characterized by a precise power absorption behaviour. Said power absorption behaviour, by means of suitable instruments for measurement, can be reduced to a trace on a cartesian graph in which the power measured appears on the ordinate and the time appears on the abscissa. In each individual heating area, the corresponding power graph is acquired and analysed with appropriate software for process control, which, as will be seen, is based upon control charts, given that said techniques enable identification of the deviation of a process.

Statistical process control provides the possibility of determining whether a process remains stable over time, or else whether, instead, it is influenced by systematic errors that disturb it.

There are now provided, purely by way of example, some typical tests on control charts, from which it may be deduced that, even though all the points measured fall within the control limits, if said points are arranged in a systematic or non-random way, it is possible to establish that the process is in a state where it tends to present faults. Some examples of check tests appear in what follows and in the following table illustrated in FIG. 4.

Test 1: Point outside the limits.

This indicates that the mean of the process has deviated.

Test 2: Nine consecutive points are on the same side of the mean of the card.

This indicates that the mean of the process has deviated.

Test 3: A sequence of six consecutive points increasing or decreasing is noted.

This indicates that the mean of the process tends to shift.

Test 4: Fourteen consecutive points alternate up and down.

This indicates that the process involves a number of currents and that the samples alternate between two or more process levels.

Test 5: Two out of three consecutive points are outside the threshold.

This indicates that the mean of the process has deviated.

Test 6: Four out of five consecutive points are beyond the upper-limit and lower-limit thresholds.

This indicates that the mean of the process has deviated.

By way of example, appearing below is the graph of the instantaneous absorption of power and a possible test.

The Following Conditions are Considered as Process Faults:
  a) all measurement points outside the control limits
  b) nine consecutive measurement points all above the mean of the process
  c) nine consecutive measurement points all below the mean of the process
  d) six consecutive points with increasing value
  e) six consecutive points with decreasing value The number and position of said possible anomalous points enable not only detection and location of the presence of a defect of some sort, but also identification of the type and seriousness thereof, thus enabling an immediate and targeted remedial intervention.

In practice then, the invention, through the qualitative and quantitative monitoring of the power absorbed by each resistor of the flow unit, enables fundamental indications for correct operation of the moulding equipment to be obtained in real time and even remotely.

BRIEF DESCRIPTION OF THE DRAWINGS

The invention will now be described in detail with reference to the annexed plate of drawings, which are provided purely by way of non-limiting example and in which.

DETAILED DESCRIPTION OF THE INVENTION

Figure 1:
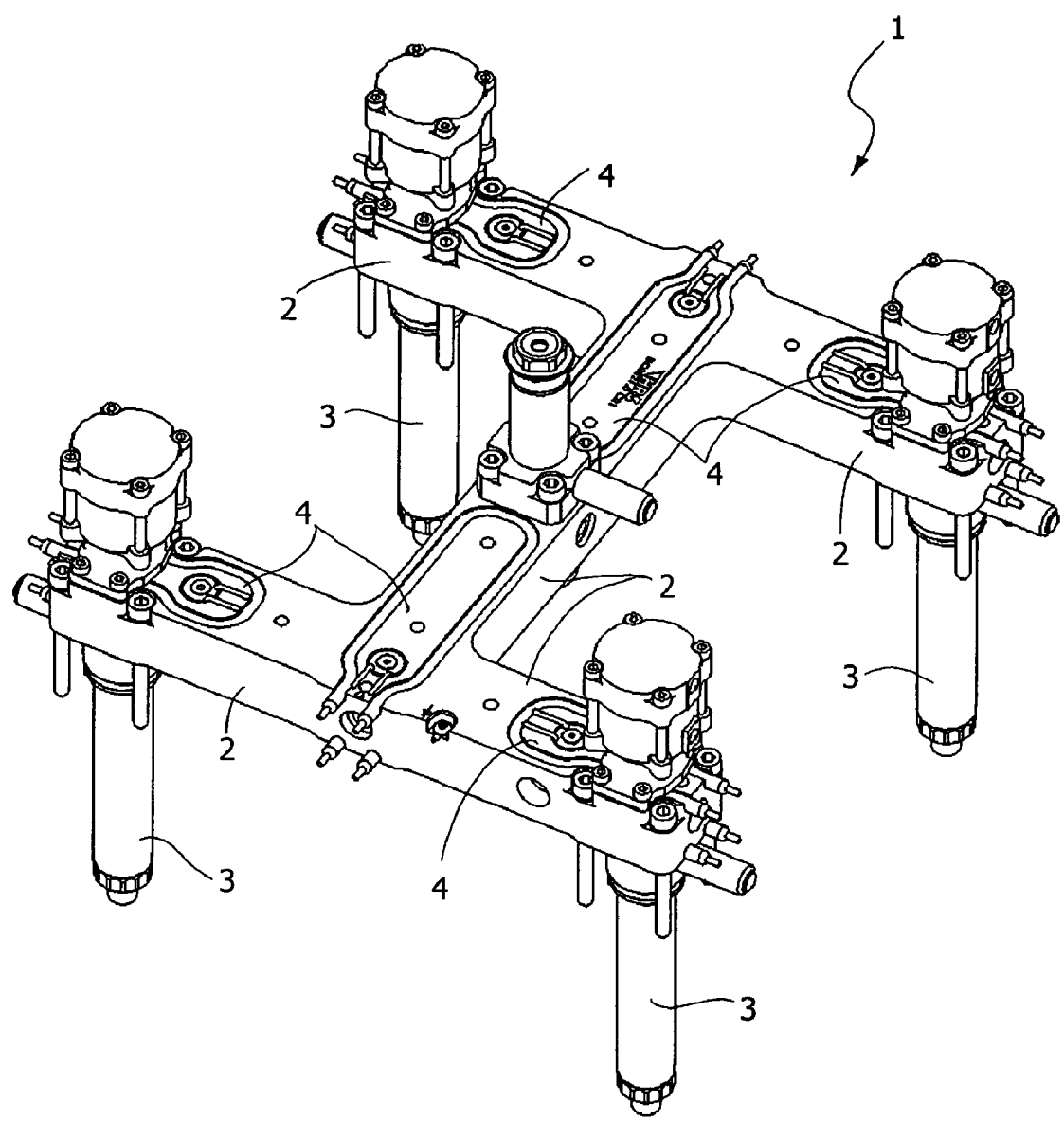
FIG. 1 is a schematic perspective view illustrating an example of a flow unit (hot chamber) of injection-moulding equipment for plastic materials to which the invention is applicable.

In FIG. 1 the reference number 1 generally designates a flow unit for injection-moulding equipment for plastic materials, consisting of a hot runner formed by hot-runner tubular arms 2, along which the fluid plastic material kept at a high temperature flows, to be introduced, through respective injectors 3, into a mould. Each tubular arm 2 and each injector 3 is equipped with one or more electrical heating resistors 4 controlled by one or more thermocouples by means of a thermoregulation unit.

Figure 2:
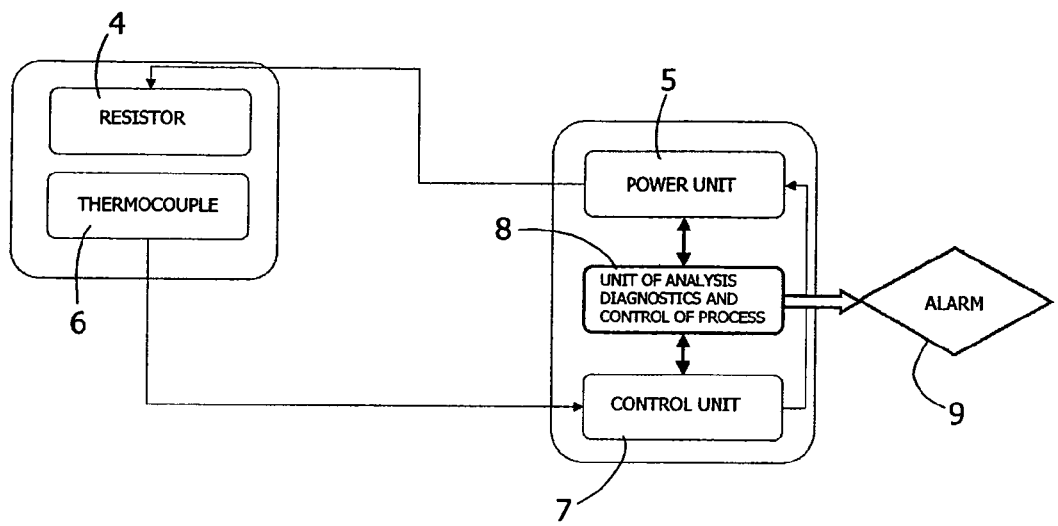
FIG. 2 is a logic diagram of the system of electrical supply and control of a heating component of the flow unit of FIG. 1.

FIG. 2 shows in brief the logic diagram of the system of supply and control of the heating resistors: each resistor 4 is supplied by a power unit 5 through the signals sent by the corresponding thermocouple 6 to the thermoregulation unit, designated by 7. The latter modulates the supply of the resistor 4 by the power unit 5 as a function of the temperature of the resistor 4 itself detected by the thermocouple 6, increasing it or reducing it.

According to the invention, the control unit 7 is equipped with one or more modules of analysis and diagnostics 8, via which, with an appropriate acquisition software, the absorption of power of each resistor 4 is qualitatively and quantitatively monitored and analysed to obtain, through the absorption detected, indications corresponding to possible faults of operation and/or installation of the hot chamber 1 or of its components.

As already explained previously, the invention is based upon the realization that each individual area of heating of the hot chamber is characterized by a power absorption behaviour of its own, which reflects on the absorption of power of the corresponding resistor. Said power behaviour can be reduced to a trace on a Cartesian graph of the profile of the power absorbed as a function of time.

Figure 6:
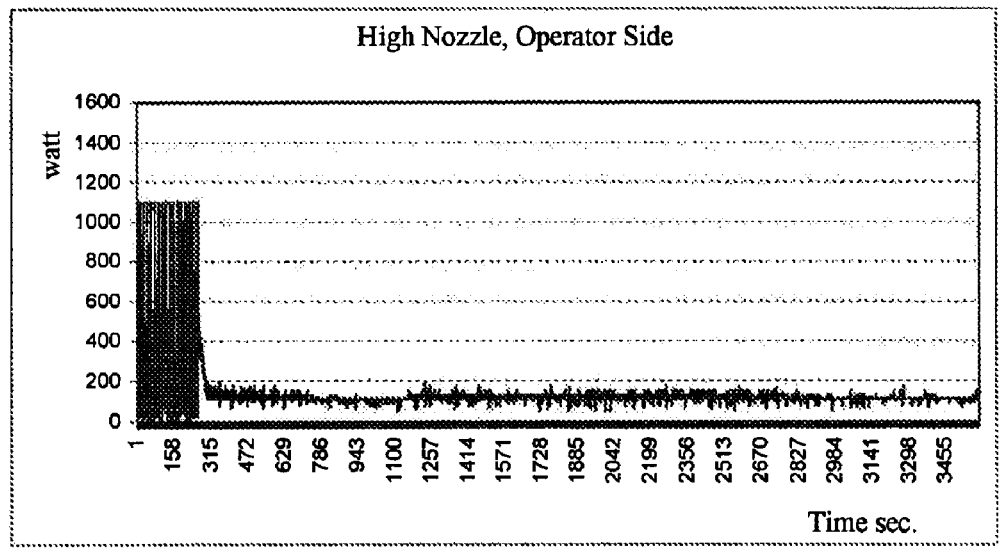
FIG. 6 is a graph of dynamic conditions of molding and temperature variation.
Figure 7:
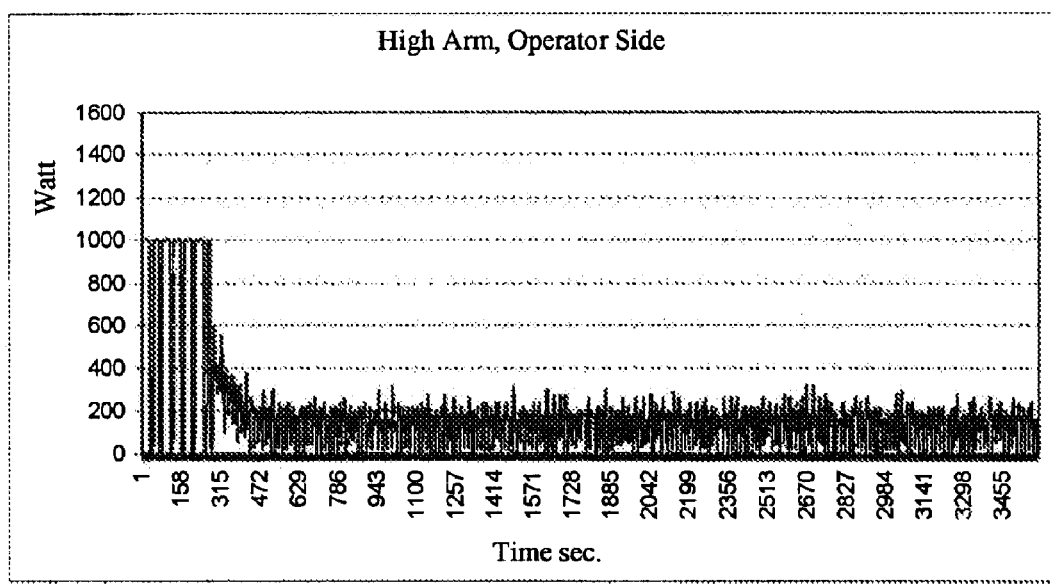
FIG. 7 is another graph of dynamic conditions of molding and temperature variation.

For example, the two graphs appearing in FIGS. 6 and 7 represent the profile in time (expressed in seconds) of the instantaneous absorption of power (expressed in watts), respectively, of a resistor 4 associated to an injector 3 assembled on a mould, and a resistor 4 associated to an arm 2 of the hot chamber 1.

Figure 8:
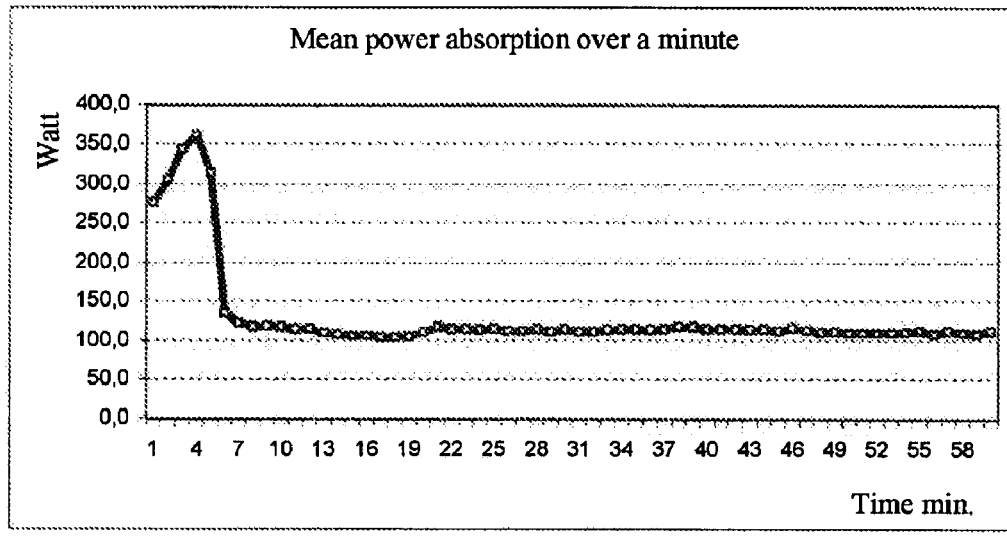
FIG. 8 depicts the graphs of FIGS. 6 and 7 wherein the adsorption of power is averaged over a minute.
Figure 8:
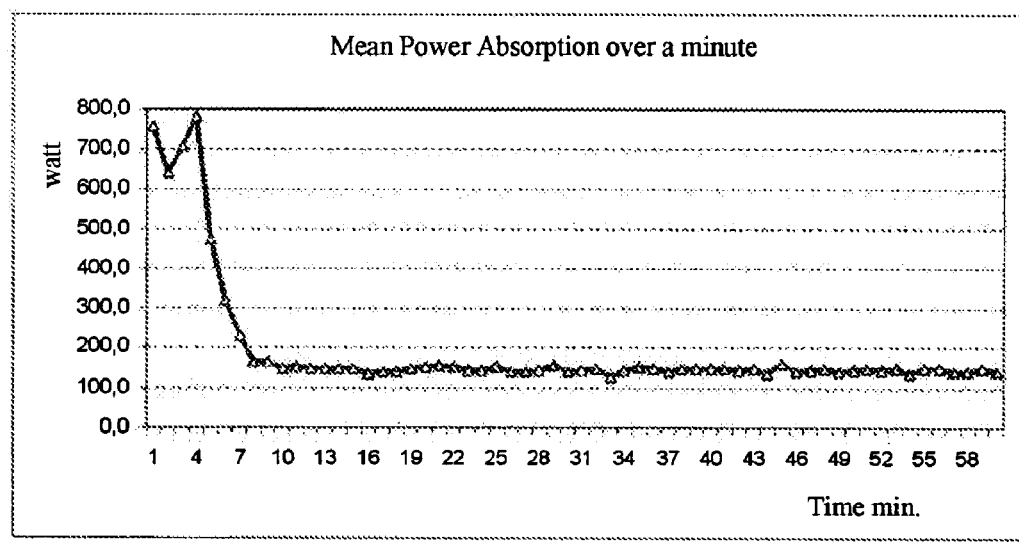

The graphs appearing FIGS. 6 and 7 vary as the dynamic conditions of moulding and of temperature vary. If the absorption of power is averaged over a minute, the graphs in FIGS. 6 and 7 assume the configuration depicted in FIG.8.

Synchronization of the recording in time of the power trace of each individual area in the hot chamber with the cycle of transformation of the plastic polymer to be injected enables positioning of the origin of the Cartesian coordinates. This synchronization is obtained, for example, using a digital signal issued by the press of the moulding equipment in concomitance with the start of injection. The acquisition of the power trace of each individual area of control of the temperature of the hot chamber is started by the digital signal and stops at the subsequent signal for start of injection. By so doing, whilst a new power graph is acquired, the previous one is compared with a sample graph initially stored for each area controlled. In each individual area of heating, the corresponding power graph is acquired and analysed with an appropriate software for process control based, for example, upon the control charts referred to previously. Said techniques enable identification of the deviation of a process. The comparison, for example, between the two graphs, i.e., between the last graph recorded and the sample one, enables verification of whether the first presents or not points of measurement outside the band of tolerance defined along the entire path of the sample graph.

In conditions of absence of faults, all the points of the last graph recorded fall, of course, within the band of tolerance on the sample curve. Instead, in the presence of faults, some points of the curve recorded will fall outside the pre-set band of tolerance: how many points (quantitative control) and when and where these points are outside the pre-set band of tolerance (qualitative control) constitute the indications that enable identification not only of the position and seriousness of the fault, but also the type of fault.

Figure 3:
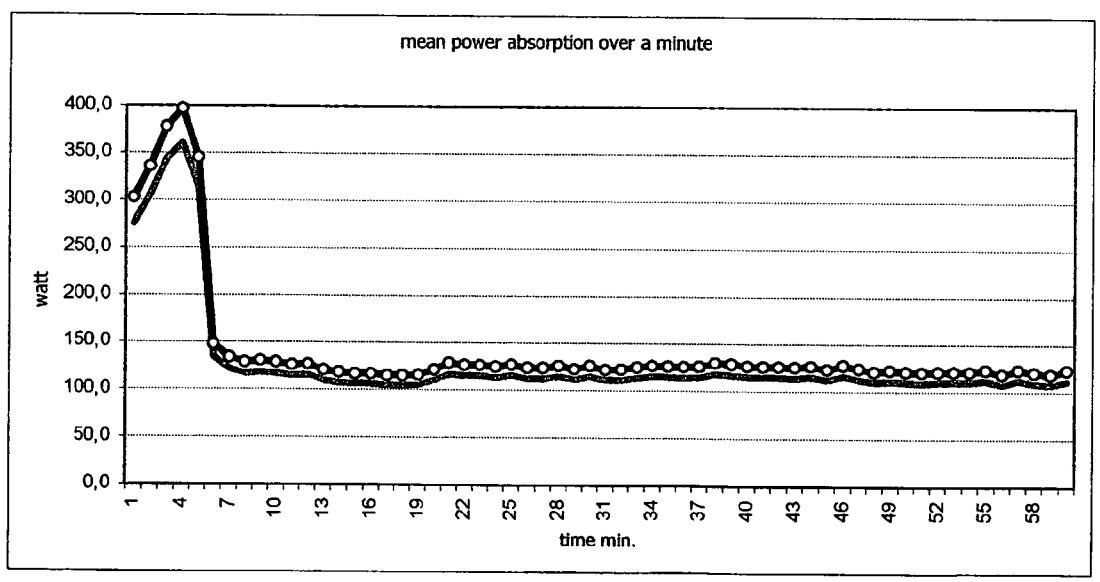
FIG. 3 is a diagram that shows an example of measured profile of the power absorbed in time by the component illustrated in FIG. 2, in comparison with a sample profile.
Figure 4:
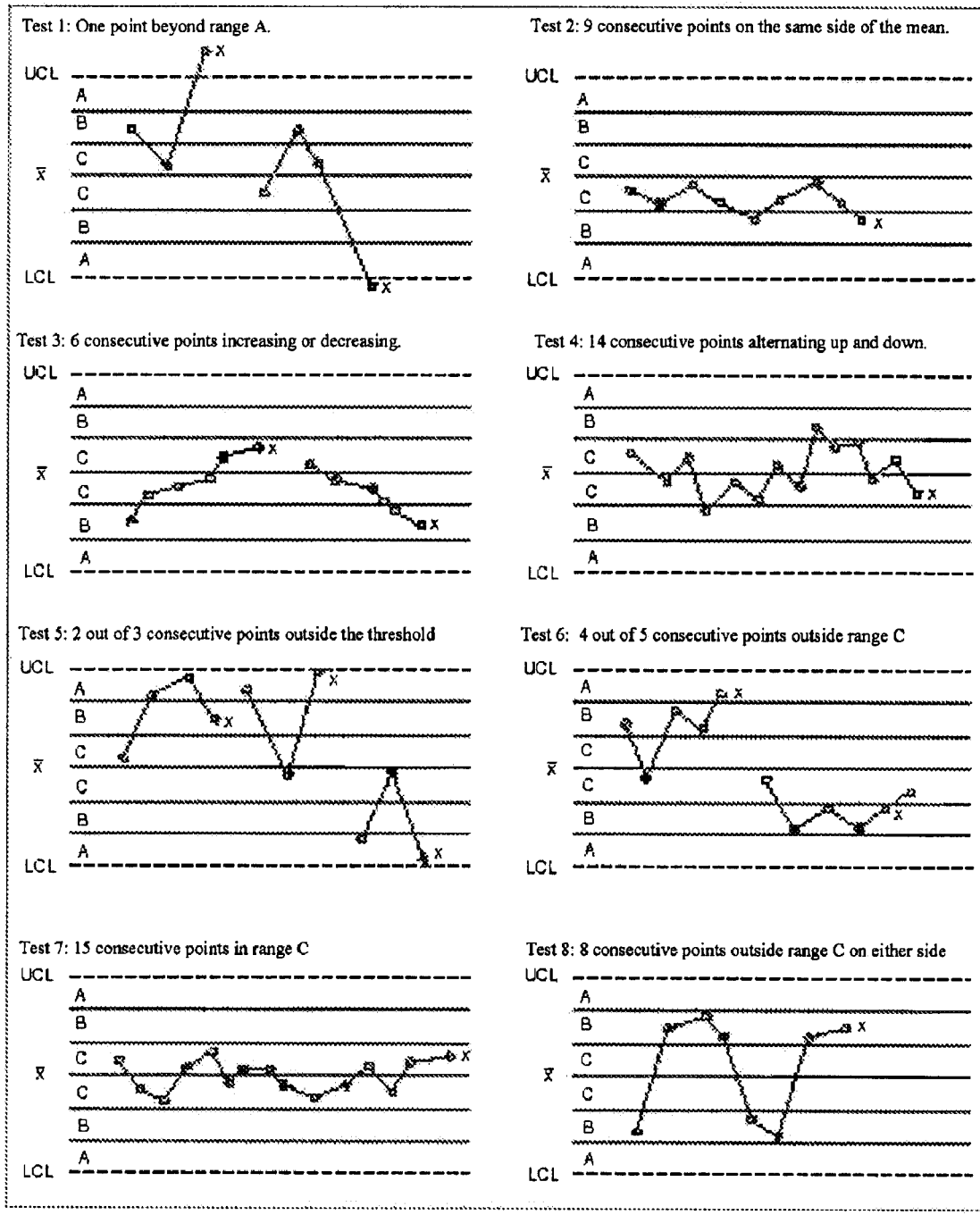
FIG. 4 is a table of check tests.
Figure 5:
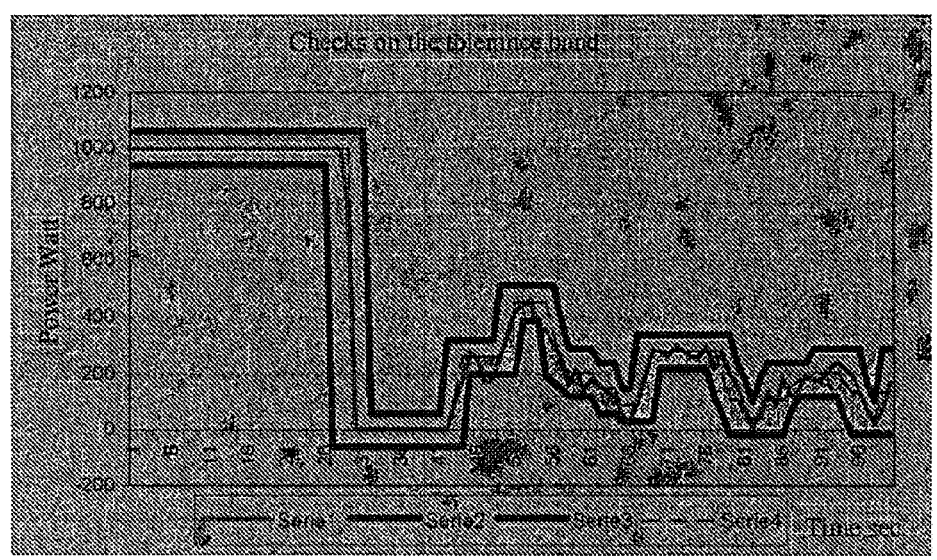
FIG. 5 is a graph of instantaneous absorption of power and a possible test.

An example of comparison between the Cartesian graph of power absorbed (expressed in watts) versus sample time (expressed in minutes) and the one measured during a cycle of moulding, for example for a resistor 4 operatively associated to one of the injectors 3, is represented in the graph of FIG. 3. In said graph the lighter curve indicates the power absorption corresponding to the case where the injector 3 is assembled correctly with respect to the mould, whilst the darker curve indicates, instead, the absorption power of the same injector in the case where it is installed in an incorrect way in the corresponding seat of the mould, in particular with an excessive contact, which generates a greater absorption. The graph of instantaneous absorption W/s in the same way may provide significant indications during the dynamic step of moulding, where the variables present sharper profiles. The analyses of said instantaneous graphs enable verification of the stability of the process and interpretation of possible anomalous situations. Even if the mean value over a minute remains unvaried, said graphs will enable identification of the instantaneous values and hence real-time operation of the system. In this way, all the deviations of the process may be identified very rapidly indeed and evaluated by means of appropriate control-card analyses performed via software. Using the method described previously, the unit of analysis and diagnostics 8 is thus able to identify, locate and discriminate the fault in real time, generating, for example, a remotized alarm signal 9 in such a way as to enable an immediate remedial intervention.

Likewise, even an extremely small contact between the injector and the mould may be detected, or else a leakage of plastic material between the injector and the mould, or else a leakage of the liquid for cooling the mould or the imminent failure (burn-out) of a resistor, or else again the dynamic deviation of the stability of the process. Each internal or external factor that alters the correct conditions of operation will generate a qualitative and quantitative deviation of the power absorption of the area immediately adjacent to the perturbation.

The unit of analysis and diagnostics 8 will be programmed on the basis of a series of reference parameters and curves so as to carry out process control continuously, identifying each deviation and the corresponding cause and thus supplying corresponding information or alarm signals. The unit of analysis and diagnostics 8 may also possibly be pre-arranged for attempting to correct any faults of modest degree that might arise, by acting on the control unit 7 of the power unit 5.

The unit of analysis and diagnostics 8 may be equipped with an appropriate module for acquisition of signals regarding the pressure and temperature of the molten polymeric material within the hot chamber or on the pattern of the mould, as well as of signals of position of the plasticizing cylinder of the press. Thanks to these optional parameters, the unit can analyse the process, verify its stability, and, in the event of any deviation, signal on the display the moulding settings (speed, pressure of injection, temperature of nozzles, etc.) to be corrected on the injection press to bring the process back into conditions of stability.

Said unit 8 may also be appropriately interfaced with the injection press and hence enable direct control of the aforesaid parameters.

It should be pointed out that the graph represented in FIG. 3 exemplifies the power absorption of one of the injectors 3: the diagrams corresponding to different areas of heating of the hot chamber 1, for example the ones corresponding to the arms 2, will present both different qualitative and quantitative profiles of the power absorbed in time, such as the ones illustrated previously.

Of course, the details of construction and the embodiments may vary widely with respect to what is described and illustrated herein, without thereby departing from the scope of the present invention, as defined in the ensuing claims.

What is claimed is:

1. Equipment for injection-moulding for plastic materials, including
   at least one flow unit for the plastic materials in a fluid state with at least one heating device including at least one electrical resistor and a control thermocouple associated thereto and supplied by a power unit,
   a thermoregulation unit for modulating a supply of said at least one resistor by said power unit as a function of a temperature of said at least one resistor detected by said thermocouple, wherein said thermoregulation unit is arranged to check absorption of power of said at least one resistor and to detect, through said absorption, indications corresponding to any faults of at least one of an operation and an installation of said flow unit;
   wherein said thermoregulation unit incorporates a unit of analysis and diagnostics for the qualitative and quantitative verification of said power absorption; and
   wherein said unit of analysis and diagnostics operates on a basis of a comparison between a profile of the detected absorption of power over time and a sample profile.

2. The equipment according to claim 1, wherein said unit of analysis and diagnostics operates on a basis of process analysis based upon control charts.

3. The equipment according to claim 1 wherein said unit of analysis and diagnostics is moreover provided for identifying, on the basis of said comparison, a type of a possible fault.

4. The equipment according to claim 1 associated to moulding equipment including an injection press, wherein said unit of analysis and diagnostics operates in a synchronized way with said injection press.

5. The equipment according to claim 1, wherein said unit of analysis and diagnostics is arranged to supply information or remote alarm signals.

6. The equipment according to claim 1, wherein said flow unit consists of a hot runner with tubular arms and related injectors.

* * * * *